March 9, 1954   F. MARTI ET AL   2,671,309
BEARING FOR CLOCKWORK MEMBERS
Filed Feb. 12, 1952

INVENTORS
FRITZ MARTI
GEORGES BRAUNSCHWEIG
BY
ATTORNEY

Patented Mar. 9, 1954

2,671,309

UNITED STATES PATENT OFFICE 2,671,309

BEARING FOR CLOCKWORK MEMBERS

Fritz Marti and Georges Braunschweig,
La Chaux de Fonds, Switzerland

Application February 12, 1952, Serial No. 271,089

Claims priority, application Switzerland
February 14, 1951

4 Claims. (Cl. 58—140)

Our invention has for its object a bearing for clockwork members.

It is characterized by the fact that an annular member is inserted between the endstone or cap jewel and the bushing or throughstone coaxially with the latter and is provided in its outer portion with capillary recesses adapted to serve as an oil container, said recesses communicating with the empty space at the center of said annular member.

Accompanying drawings illustrate by way of example two embodiments of the bearing forming the object of my invention. In said drawings.

Figure 1:
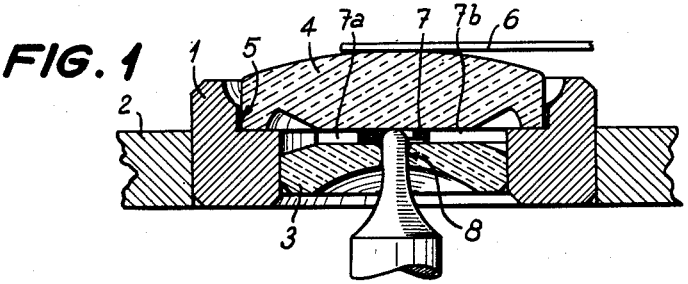
Fig. 1 is an axial cross-section of a bearing for a clockwork balance staff.
Figure 2:
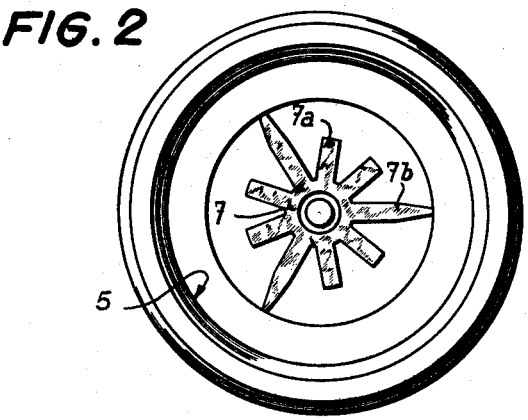
Fig. 2 is a view thereof from above after removal of the endstone.

In the first embodiment, the bearing body or support designated by the reference number 1 is fitted inside the balance cock 2. The bushing 3 constituted by a perforated stone is fitted inside the body 1 which forms a bezel, while the endstone 4 rests in a groove 5 formed on the inside of the support 1. It is held in position by a spring 6. The space separating the bushing 3 from the endstone 4 is partly occupied by an annular member 7 coaxial with the stones 3 and 4 and provided with radial arms 7a and 7b.

The thickness of said arms is equal to the distance separating the two stones 3 and 4 in the vicinity of their central portion while the ring-shaped central portion of the member is less thick.

These arms define with one another capillary channels arranged annularly round the central portion of the member 7. These capillary channels are intended to form containers for the oil which may enter the central bore in the member 7 by reason of the reduced thickness given to the ring-shaped part of said member surrounding its center.

The member 7 is arranged coaxially with the bore 8 in the bushing and is held in said position by the arms 7b the number of which is equal to three and that are arranged at 120° from one another while their outer ends engage the bearing body or support 1 so as to provide for an accurate centering of the member 7.

Figure 3:
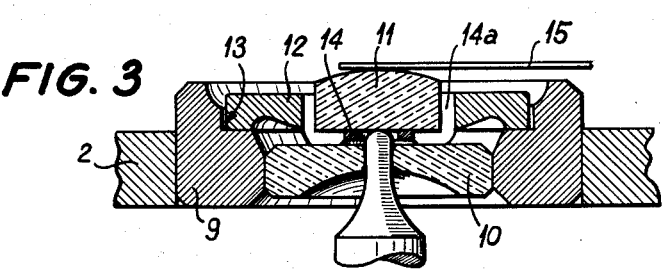
Fig. 3 is an axial cross-section through a modification.
Figure 4:
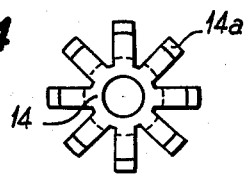
Fig. 4 is a view from above of a detail part.

In the second embodiment shown in Fig. 3, the bearing body is designated by the reference number 9, the perforated stone by 10 and the endstone by 11. The diameter of the latter is substantially smaller than that of the perforated stone. Said endstone is held in position by an independent bezel 12, resting in the annular groove 13 formed in the body 9. An annular member 14 is fitted between the two stones and is provided with radial arms 14a the outer ends of which are folded upwardly into contact with the sides of the endstone 11. The latter is fitted inside the annulus thus constituted by the folded ends of the arms 14a (Fig. 4), said annulus being fitted frictionally inside the central opening of the bezel 12. The system comprising the bezel 12, the member 14 and the endstone is held in the desired position by a spring 15. The member 14 plays the same part as the member 7 in the first embodiment.

The arrangement disclosed allows increasing the distance between the two stones and increasing thereby the oil provision, as without the intermediary member 7 or 14 described, the space in which oil may be stored would be obviously very small if the structure is to be a capillary one.

What we claim is:

1. A bearing for a clockwork member, comprising an endstone, a bushing arranged coaxially with reference to the endstone, a support for the bushing and endstone, an annular member arranged coaxially between the endstone and the bushing and provided, at its periphery, with capillary channels serving as an oil container and, on at least one of its faces, with a passage to provide a communication between the bore in said annular member and said capillary channels.

2. A bearing for a clockwork member, comprising an endstone, a bushing arranged coaxially with reference to the endstone, a support for the bushing and endstone, an annular member arraged coaxially between the endstone and the bushing and including an annular central part, equidistant radial arms rigid with the outer periphery of said annular member and bent upwardly at right angle so as to surround said endstone, said arms being formed so as to provide capillary spaces serving as oil containers, and said member being provided, on at least one of its faces, with an annular passage to provide a communication between the bore in said annular member and said capillary spaces.

3. A bearing for a clockwork member, comprising an endstone, a bushing arranged coaxially with reference to the endstone, a support for the bushing and endstone, a bezel fitted annularly between the endstone and the support, an annular member arranged coaxially between the endstone and the bushing and including an annular central part and radial arms rigid with the outer periphery of the annular member and the outer ends of which are bent upwardly at right angle so as to be frictionally engaged between the bezel and the endstone, said arms being formed so as to provide capillary spaces serving as oil containers, and said member being provided, on at least one of its faces, with an annular passage to provide a communication between the bore in said annular member and said capillary spaces.

4. A bearing for a clockwork member, comprising an endstone, a bushing arranged coaxially with reference to the endstone, a support for the bushing and endstone, a bezel fitted annularly between the endstone and the support, an annular member arraged coaxially between the endstone and the bushing and including an annular central part and radial arms rigid with the outer periphery of the annular member and the outer ends of which are bent upwardly at right angle so as to be frictionally engaged between the bezel and the endstone, said arms being formed so as to provide capillary spaces serving as oil containers, the thickness of said radial arms being equal to the distance separating the bushing from the endstone and the annular central part being thinner, at least through a part of its periphery, to provide a communication between its bore and the capillary oil-containing spaces between the radial arms.

FRITZ MARTI.
GEORGES BRAUNSCHWEIG.

References Cited in the file of this patent

UNITED STATES PATENTS

| Number | Name | Date |
|---|---|---|
| 2,612,417 | White | Sept. 30, 1952 |

FOREIGN PATENTS

| Number | Country | Date |
|---|---|---|
| 238,179 | Switzerland | Oct. 1, 1945 |
| 244,264 | Switzerland | Mar. 17, 1947 |